May 22, 1934.  E. E. GREVE  1,959,823
ROTARY SWIVEL
Filed Feb. 26, 1930
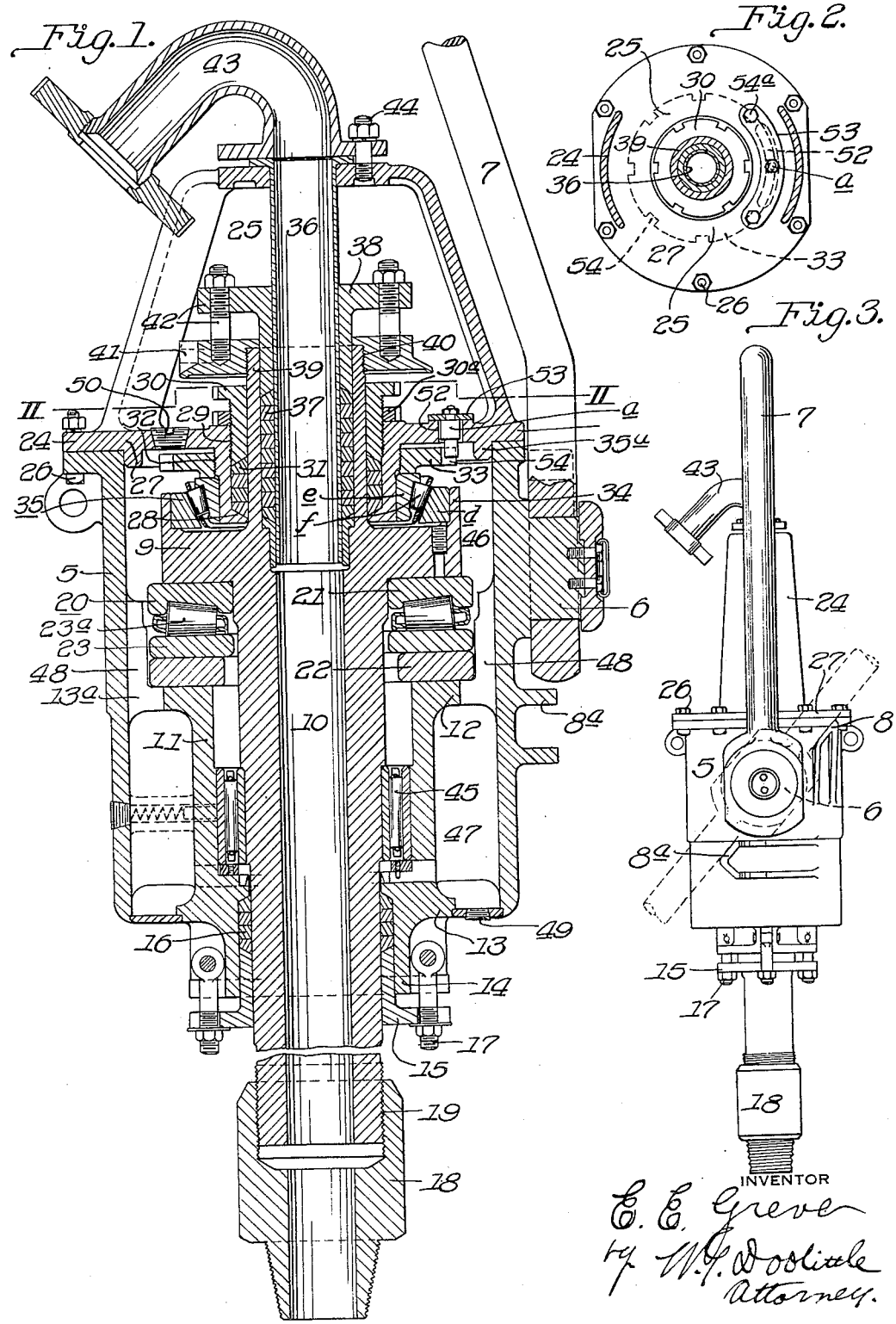
INVENTOR
E. E. Greve
by W. F. Doolittle
Attorney.

Patented May 22, 1934

1,959,823

UNITED STATES PATENT OFFICE 1,959,823

ROTARY SWIVEL

Edgar E. Greve, Bellevue, Pa., assignor, by mesne assignments, to Oil Well Supply Company, Pittsburgh, Pa., a corporation of New Jersey Application February 26, 1930, Serial No. 431,413

4 Claims. (Cl. 255—25)

This invention relates to swivels, and particularly to that type of swivel known as rotary swivels for use in connection with rotary well drilling apparatus.

The prime object of the present invention is to provide a new and improved rotary swivel of the character specified of simple, strong and durable construction, embodying simple and efficient means for adjusting the bearings employed in connection with the swivel stem and swivel head, means for preventing cuttings and other foreign matter entering the bearings, and effective means for supporting the bail of the swivel when the swivel is in non-operative position.

In the accompanying drawing, which illustrates an application of my invention:

Fig. 1 is a vertical sectional view of a swivel embodying my invention, one half of the view being taken on a plane at right angles to the other half;

Fig. 2, a cross sectional view taken on the line II—II of Fig. 1; and

Fig. 3, an elevational view.

Referring to the drawing, 5 designates a hollow body, casing or trunnion block of the swivel structure, and 6 trunnions projecting outwardly therefrom adapted for engagement with a bail 7, whereby the swivel may be suspended in the usual manner from a traveling or hoisting block, not shown. Formed integral with, or suitably attached to the exterior of the body, I provide upper and lower outwardly extending lugs 8 and 8a constituting bail rests designed for supporting the bail in such angular positions that it may be readily attached to the hook carried by the traveling block. The provision of the upper and lower rests positioned as illustrated, relatively close to the trunnions, provides means for positioning the bail so that it may be engaged with the hook of the block, either when standing in the derrick or in other positions it may be placed in practice.

The hollow casing is designed to receive the swivel head 9 and a portion of the hollow swivel stem 10, as well as the bearings and packing materials, and is formed with an annular wall 11 having a flange 12 and an annular flange 13, and with spaced apart ribs 13a. 14 designates a projecting extension of wall 11 designed to receive a follower 15 and packing 16, the latter being interposed between a portion of the swivel stem and the said extension and held in position by the follower. Bolts 17 are employed for adjustably securing the follower 15 in operative position. A coupling member 18 is threaded, as at 19, to an end of the swivel stem for connecting a drill pipe, not shown.

Interposed between the upper end of the wall 11, which is spaced from the inner surface of the casing wall, and the under side of the swivel head, I provide the main anti-friction bearing 20. This bearing 20 includes upper and lower plates 21 and 22, an intermediate plate 23, and rollers 23a, supported by the hollow body.

Closing the upper end of the body or casing 5 is a cap 24 having opening 25 for permitting access to the interior of the cap for manipulating enclosed operating parts, said cap being attached to the body by means of bolts 26. Bottom portion 27 of the cap has a depending annular wall 28 interiorly threaded at 29 to receive and cooperate with a gland or follower 30, the latter resting upon a packing 31. 30a is a nut lock for the follower. Wall 28, for a portion of its length, is exteriorly threaded at 32 to receive and cooperate with an adjusting nut or member 33, and disposed between member 33, wall 28, a flange 34 of the swivel head, and the upper surface of the head, is a bearing 35.

An important feature of the cap construction is an annular flange 35a. This flange, when the cap is placed on the body, enters the upper end of the body and snugly fits the opening thereof, thus reinforcing the body and preventing a collapse or injury to the body or casing at this point, which is subjected to considerable strain due to the weight of the trunnions and the pull exerted by the bail.

For the purpose of receiving a portion of a water pipe 36, packing 37 and a follower or gland 38, the swivel head is provided with a hollow extension 39 threaded at 40 to receive an annular member 41, the latter being adjustably connected by screw bolts 42 to the gland 38. Member 41 projects beyond gland 30, and it will be noted that any mud or other foreign matter that may work up between the water tube and packing would strike member 41 and be discharged away from gland 30 and its cooperating packing, thereby preventing any foreign matter working into the operating parts of the swivel. A goose-neck or hose connection 43 is attached to the upper end of the closure cap 24 by means of threaded bolts 44.

In addition to the main bearing 20 and the bearing 35, I provide thrust bearings 45 located between the swivel stem and the wall 11 of the casing. In connection with the bearings, attention is called to the fact that the construction and assemblage of parts is such that cuttings from upper bearings are prevented from working into lower bearings. The swivel head 9 operates in the upper chamber or space 46 of the casing, and this chamber is in open communication with lower chamber or space 47 by means of a passage 48. Cuttings from bearings 35 will be thrown off into the chamber 46 and will pass downwardly through said chamber, out of contact with the main bearings, and into chamber 47 by passages 48; and cuttings from the main bearings will also pass downwardly without coming into contact with bearings 45. 49 designates cleaner plugs closing openings in the lower portion of the casing through which cuttings and other foreign matter may be removed.

Closure cap 24 is provided with an opening closed by a filler plug 50. In addition to the parts just described, portion 27 of the cap is formed with an opening 52, normally covered by a plate 53, through which a member may be passed to engage a cut-away portion 54 of the adjusting member 33 to turn said member to effect adjustment. Plate 53 carries a locking member a designed to project through the opening 52 and engage a cut-away portion 54 when the adjusting member has been turned to the desired position.

From the foregoing, it will be noted that the adjusting member 33 may be turned to effect the desired adjustment of the bearings without the necessity of removing the cap from the casing, it being only necessary to remove plate 53 in order to turn member 33 on the threaded portion 32 of the depending annular wall 28 of the bottom portion 27 of the cap. After adjustment, plate 53 is replaced and secured by bolts 54a with the locking member a in engagement with a cut-away portion 54.

Upper bearing 35, as illustrated and as preferred, includes a bearing plate d, a race-way plate e, and rollers f. This bearing is supported by the swivel head, with the raceway e positioned outside of and below the contacting adjusting member 33.

I claim:

1. In a rotary swivel, the combination with a hollow body, a swivel stem, a swivel head, a cap closure for the body comprising a portion having a centrally disposed depending wall entered in the body, said wall having an exteriorly threaded portion, anti-friction means between the swivel head and the depending wall, and bearing adjusting means comprising a threaded member mounted on the threaded portion of the depending member.

2. In a rotary swivel, the combination with a hollow body, a swivel stem, a swivel head, a cap closure for the body comprising a bottom portion having a centrally disposed depending wall entered in the body, said wall having an exteriorly threaded portion, anti-friction means between the swivel head and the depending wall, bearing adjusting means comprising a threaded member mounted on the threaded portion of the depending wall, and cooperating locking means on the cap and adjusting member for locking the bearing adjusting means in adjusted position.

3. In a rotary swivel, the combination with a hollow body, a swivel stem, a swivel head, a cap closure for the body comprising a bottom portion having a centrally disposed depending wall entered in the body, anti-friction means between the swivel head and the depending wall, bearing adjusting means operatively positioned on said wall for effecting an adjustment of the bearing, said bottom portion having an opening to permit access to the adjusting means, and a plate normally covering said opening.

4. In a rotary swivel, the combination with a hollow body, a swivel stem, a swivel head, a cap closure for the body comprising a bottom portion having a centrally disposed depending wall entered in the body, anti-friction means between the swivel head and the depending wall, bearing adjusting means operatively positioned on said wall for effecting an adjustment of the bearing, said bottom portion having an opening to permit access to the adjusting means, a plate normally covering said opening, and a locking member for cooperation with the adjusting means carried by the plate.

EDGAR E. GREVE.